US009874101B2

(12) United States Patent
Xu

(10) Patent No.: US 9,874,101 B2
(45) Date of Patent: Jan. 23, 2018

(54) PLATFORM WITH CURVED EDGES

(71) Applicant: United Technologies Corporation, Hartford, CT (US)

(72) Inventor: JinQuan Xu, East Greenwich, RI (US)

(73) Assignee: United Technologies Corporation, Hartford, CT (US)

(*) Notice: Subject to any disclaimer, the term of this patent is extended or adjusted under 35 U.S.C. 154(b) by 219 days.

(21) Appl. No.: 14/652,657

(22) PCT Filed: Feb. 12, 2013

(86) PCT No.: PCT/US2013/025741
§ 371 (c)(1),
(2) Date: Jun. 16, 2015

(87) PCT Pub. No.: WO2014/105103
PCT Pub. Date: Jul. 3, 2014

(65) Prior Publication Data
US 2015/0315916 A1 Nov. 5, 2015

Related U.S. Application Data

(60) Provisional application No. 61/746,610, filed on Dec. 28, 2012.

(51) Int. Cl.
F01D 5/14 (2006.01)
F01D 9/04 (2006.01)
F01D 5/02 (2006.01)
F01D 9/02 (2006.01)

(52) U.S. Cl.
CPC ............ F01D 5/147 (2013.01); F01D 5/021 (2013.01); F01D 5/143 (2013.01); F01D 5/145 (2013.01); F01D 9/02 (2013.01); F01D 9/041 (2013.01); F05D 2220/32 (2013.01); F05D 2240/12 (2013.01); F05D 2240/30 (2013.01); F05D 2240/80 (2013.01); Y02T 50/673 (2013.01)

(58) Field of Classification Search
CPC ........... F01D 5/141; F01D 5/143; F01D 5/145
USPC ........................................... 415/191
See application file for complete search history.

(56) References Cited

U.S. PATENT DOCUMENTS 4,420,288 A 12/1983 Bischoff
6,561,761 B1 5/2003 Decker et al.
7,217,096 B2 5/2007 Lee
(Continued)

FOREIGN PATENT DOCUMENTS

GB 2042675 A 9/1980

OTHER PUBLICATIONS

International Search Report and Written Opinion from PCT Application Serial No. PCT/US2013/025741, dated Sep. 23, 2013, 16 pages.

Primary Examiner — Matthew W Jellett
(74) Attorney, Agent, or Firm — Kinney & Lange, P.A.

(57) ABSTRACT

A gas turbine engine component includes an airfoil and a platform. The airfoil has a pressure side and an opposite suction side. The platform is connected to the airfoil and has a first curved edge to the suction side of the airfoil and a second curved edge to the pressure side of the airfoil. The first and second curved edges extend along a surface of the platform having a neutral elevation with respect to a reference axisymmetrical platform surface for the gas turbine engine.

17 Claims, 2 Drawing Sheets

(56) References Cited

U.S. PATENT DOCUMENTS

| | | | |
|---|---|---|---|
| 8,459,956 B2* | 6/2013 | Pandey | F01D 5/143 416/190 |
| 8,647,067 B2* | 2/2014 | Pandey | F01D 5/143 416/193 A |
| 8,657,579 B2* | 2/2014 | Reno | F01D 5/143 415/209.4 |
| 8,961,135 B2* | 2/2015 | Beeck | F01D 5/143 416/193 A |
| 9,103,213 B2* | 8/2015 | Barr | F01D 5/143 |
| 9,175,567 B2* | 11/2015 | Aggarwala | F01D 5/143 |
| 9,188,017 B2* | 11/2015 | Xu | F01D 9/041 |
| 9,194,235 B2* | 11/2015 | Wunderer | F01D 5/145 |
| 9,347,320 B2* | 5/2016 | Gustafson | F01D 5/02 |
| 2006/0233641 A1 | 10/2006 | Lee et al. | |
| 2007/0059177 A1 | 3/2007 | Harvey | |
| 2010/0143139 A1 | 6/2010 | Pandey et al. | |
| 2010/0158696 A1 | 6/2010 | Pandey et al. | |
| 2010/0166558 A1 | 7/2010 | Siden et al. | |
| 2012/0051894 A1 | 3/2012 | Clements et al. | |
| 2012/0051930 A1 | 3/2012 | Pandey et al. | |

* cited by examiner

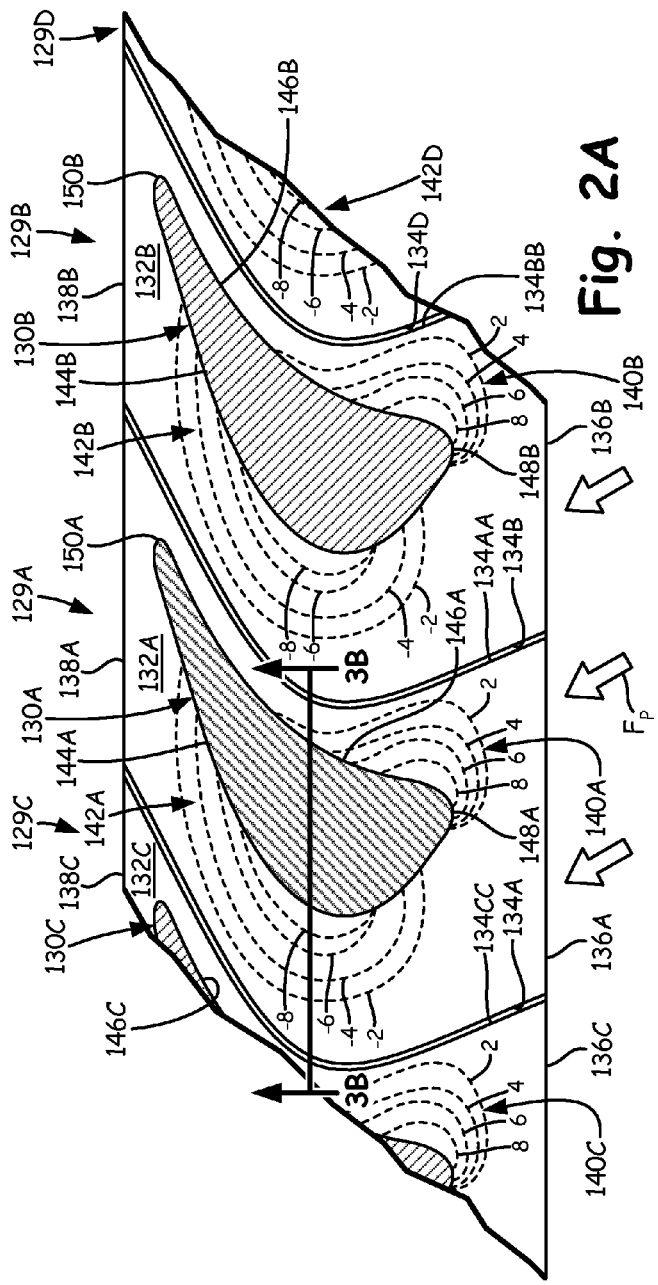
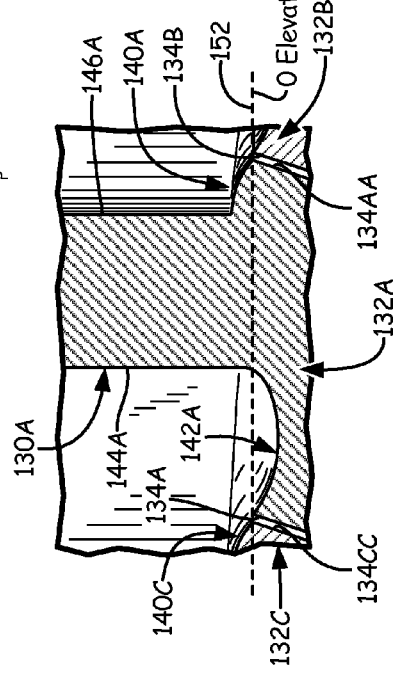
Fig. 2A
Fig. 2B

PLATFORM WITH CURVED EDGES

BACKGROUND

The present disclosure relates to gas turbine engines. More particularly, the present disclosure relates to a platform of a vane and/or blade for a gas turbine engine.

A typical gas turbine engine includes a compressor section, a combustor section, and a turbine section fluidly connected along a main gas flow path. A gas (air) enters the main gas flow path, is pressurized in the compressor section and mixed with fuel in the combustor section. The mixture of gas and fuel is ignited in the combustor section to generate hot combustion gases. The turbine section is disposed downstream of the combustor section to receive the hot combustion gases. The turbine section extracts energy from the combustion gases to power the compressor. In turbofan aircraft applications, the turbine section also powers a fan. In marine or industrial applications, the turbine section powers an external drive shaft.

In an axial flow gas turbine engine, the turbine section and the compressor section are divided into stages, each stage is typically comprised of a plurality circumferentially arranged vane or blade structures. The blades are mounted to one or more hubs capable of rotation about an engine axis and the vanes are stator components that are mounted to structures such as the engine casing.

The blades and vanes include an airfoil and one or more platforms, also called endwalls. In most cases, the platforms are arranged adjacent each other to partially define a radially inner boundary of the annular main gas flow path for the gas turbine engine. The airfoils span across the main gas flow path so that the airfoil tips are in close proximity to a non-rotatable casing (in the case of rotor blades) or connect to a radially outer platform that defines a radially outer boundary of the annular main gas flow path.

During engine operation, gas (air and/or combustion gases) flows through the main gas flow path. Near the endwalls, the gas flow is dominated by a vortical flow structure known as a horseshoe vortex. The vortex forms as a result of the endwall boundary layer, which separates from the endwall as the fluid approaches the leading edges of the airfoils. The separated gas reorganizes into the horseshoe vortex. There is a high loss of efficiency associated with the vortex. The loss, commonly referred to as "secondary" or "endwall" loss, is responsible for significant efficiency loss in a row of airfoils.

SUMMARY

A gas turbine engine component includes an airfoil and a platform. The airfoil has a pressure side and an opposite suction side. The platform is connected to the airfoil and has a first curved edge to the suction side of the airfoil and a second curved edge to the pressure side of the airfoil. The first and second curved edges extend along a surface of the platform having a neutral elevation with respect to a reference axisymmetrical platform surface for the gas turbine engine.

A stage for a gas turbine engine includes a row of airfoils and a platform attached to each airfoil. The airfoils are spaced apart from one another to define flow channels therebetween. Each airfoil has a pressure side and an opposite suction side. Each platform has a first curved edge to the suction side of the airfoil and a second curved edge to the pressure side of the airfoil. The first and second curved edges extend along a surface of the platform having a neutral elevation with respect to a reference axisymmetrical platform surface for the gas turbine engine. The platform includes surface contouring between one of the suction side and the first curved edge or the pressure side and the second curved edge.

A gas turbine engine includes a row of airfoils and a platform attached to each airfoil. The airfoils are spaced apart from one another to define flow channels therebetween. Each airfoil has a pressure side and an opposite suction side. Each platform has a first curved edge to the suction side of the airfoil and a second curved edge to the pressure side of the airfoil. The first and second curved edges extend along a surface of the platform having a neutral elevation with respect to a reference axisymmetrical platform surface for the gas turbine engine. The platform includes surface contouring between the suction side and the first curved edge and between the pressure side and the second curved edge.

BRIEF DESCRIPTION OF THE DRAWINGS

FIG. 2A shows a portion of a rotor or stator stage with a plurality of airfoils and a second embodiment of the platform having curved edges.

FIG. 2B is a cross-sectional view through platforms of FIG. 2A illustrating the platform has a convex section located to a pressure side of the airfoil and a concave section located to a suction side of the airfoil.

DETAILED DESCRIPTION

Figure 1:
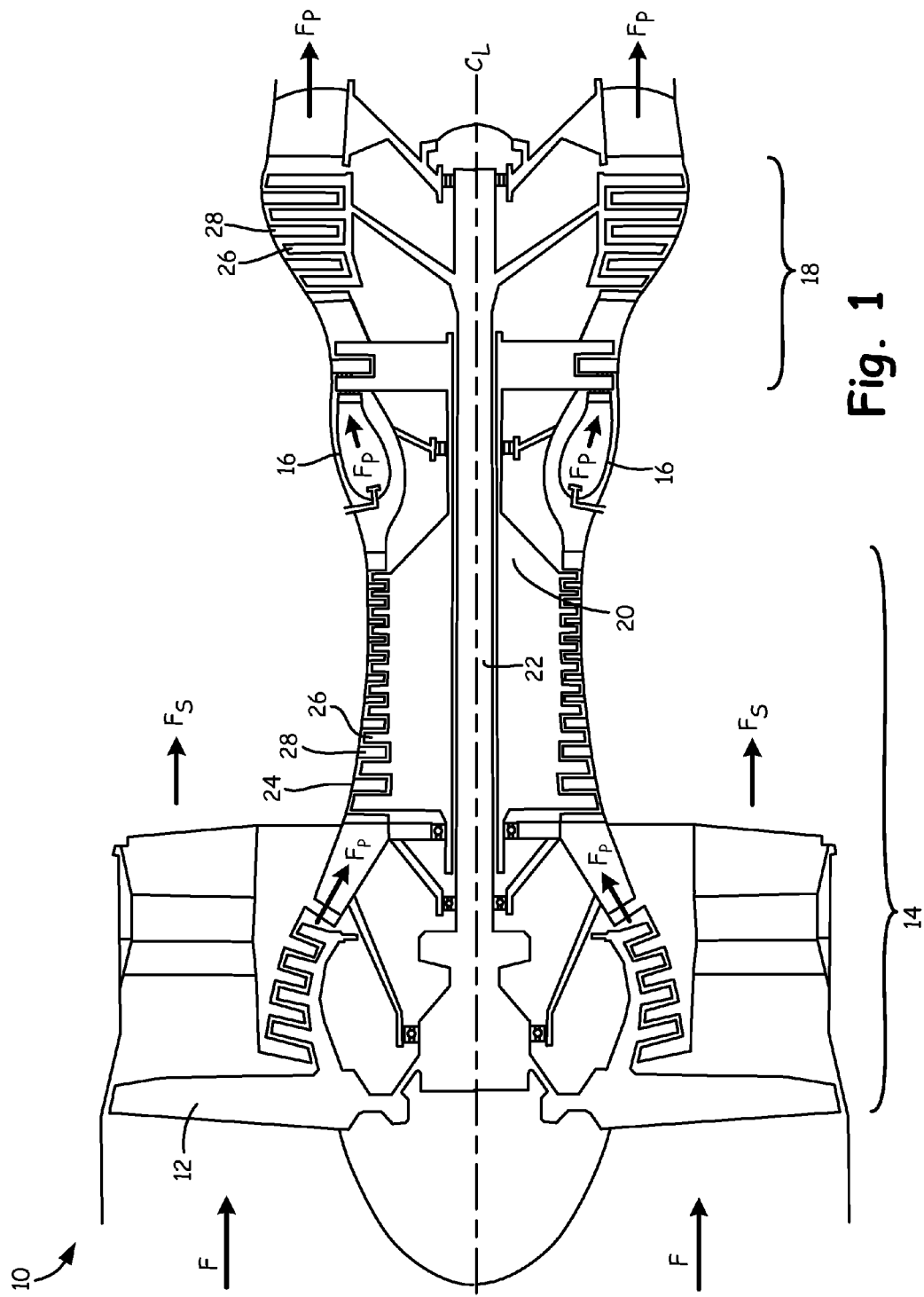
FIG. 1 is a cross-sectional view of a gas turbine engine according to an embodiment of the present invention.

The present disclosure describes vanes and/or blades with platforms having curved edges. In one embodiment, the curved edges extend along a neutral elevation surface of the platform. As a result of this configuration, the platform has a convex cross-sectional shape disposed to the pressure side of the airfoil and the platform has a concave cross-sectional shape disposed to the suction side of the airfoil. The curved edges allow the gas turbine engine to be more efficient by reducing gas flow penetration from the main gas flow path through gaps between adjacent platforms. Additionally, the curved edges act to increase the operational life of the platform by disposing the edges away from an area of higher temperature adjacent the suction side of the airfoil. In some instances, curved edge platforms are easier to manufacture, thereby reducing the cost and time associated with fabricating the platforms.

FIG. 1 is a longitudinal sectional view along an engine center line $C_L$ of a gas turbine engine 10. FIG. 1 shows gas turbine engine 10 including a fan blade 12, a compressor 14, a combustor 16, a turbine 18, a high-pressure rotor 20, a low-pressure rotor 22, and an engine casing 24. Compressor 14 and turbine 18 include rotor stages 26 and stator stages 28.

As illustrated in FIG. 1, fan blade 12 extends from engine center line $C_L$ near a forward end of gas turbine engine 10. Compressor 14 is disposed aft of fan blade 12 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan blade 12 and a high-pressure section of compressor 14. Rotor stages 26 and stator stages 28 are arranged throughout compressor 14 and turbine 18 in alternating rows. Thus, rotor stages 26 connect to high-pressure rotor 20 and low-pressure rotor 22. Engine casing 24 surrounds turbine engine 10 providing structural support for compressor 14, combustor 16, and turbine 18, as well as containment for gas flow through engine 10.

In operation, gas flow F is divided into primary gas flow Fp and secondary (bypass) gas flow Fs. Primary gas flow Fp enters compressor 14 after passing between fan blades 12. Primary gas flow Fp travels along a main gas flow path and is compressed by the rotation of compressor 14 driven by high-pressure turbine 18. The compressed gas from compressor 14 is divided, with a portion going to combustor 16 and a portion employed for cooling components, buffering, and other purposes. Compressed gas and fuel are mixed and ignited in combustor 16 to produce high-temperature, high-pressure combustion gases. Combustion gases, which are part of primary gas flow Fp exit combustor 16 into turbine section 18.

Stator stages 28 properly align primary gas flow Fp for an efficient attack angle on subsequent rotor stages 26. Primary gas flow Fp passes rotor stages 26 and drives rotation of both high-pressure rotor 20 and low-pressure rotor 22. High-pressure rotor 20 drives a high-pressure portion of compressor 14, as noted above, and low-pressure rotor 22 drives fan blades 12 to produce thrust with bypass gas flow Fs from gas turbine engine 10.

Although embodiments of the present invention are illustrated for a turbofan gas turbine engine for aviation use, it is understood that the present invention applies to other aviation gas turbine engines, to industrial gas turbine engines, and gas turbine engines for marine applications.

Although platforms with curved edges can be used with either a rotor or stator stage, in FIG. 2A the platforms with curved edges are shown in reference to a rotor stage. Thus, rotor blade 129A and portions of adjacent rotor blades 129B, 129C, and 129D are illustrated. Rotor blade 129A includes an airfoil 130A and a platform 132A. Platform 132A includes a first curved edge 134A, a second curved edge 134AA, a leading edge 136A, a trailing edge 138A, a convex region 140A, and a concave region 142A. Airfoil 130A includes a suction side 144A, a pressure side 146A, a leading edge 148A, and a trailing edge 150A. Similarly, rotor blade 129B includes an airfoil 130B and a platform 132B. Platform 132B includes a first curved edge 134B, a second curved edge 134BB, a leading edge 136B, a trailing edge 138B, a convex region 140B, and a concave region 142B. Airfoil 130B includes a suction side 144B, a pressure side 146B, a leading edge 148B, and a trailing edge 150B. The portion of rotor blade 129C illustrated in FIG. 2A includes airfoil 130C, platform 132C, curved edge 134CC, leading edge 136C, trailing edge 138C, and convex region 140C. Airfoil 130C includes pressure side 146C. The portion of rotor blade 129D illustrated in FIG. 2A includes curved edge 134D, and concave region 142D.

In the embodiment of FIG. 2A, platforms 132A-132D are sloped or curved. Thus, convex region 140A, denoted by positive elevation contour lines (isolines), is disposed adjacent to and around leading edge 148A of airfoil 130A. Concave region 142A, denoted by negative elevation contour lines is positioned adjacent to and extends away from suction side 144A of airfoil 130A.

In the embodiment of FIGS. 2A and 2B, platforms 132A-132D have curved edges 134A, 134AA, 134B, 134BB, 134CC, and 134D disposed to extend along the neutral elevation surface (a 0 elevation). Thus, for example with platform 132A, curved edges 134A and 134AA are disposed at a radial distance from the centerline axis $C_L$ of the gas turbine engine that is the same as a hypothetical reference axisymmetrical platform surface 152 that does not utilize endwall contouring. This hypothetical axisymmetrical reference platform surface 152 would have a conventional axisymmetrical surface as defined by circular arcs around the circumference of the turbine stage or compressor stage. Thus, at the same axial location along centerline axis $C_L$ the hypothetical axisymmetrical reference platform surface 152 would have a generally uniform radial distance from centerline axis $C_L$ and is without contouring features such as protrusions or depressions. Therefore, as shown in FIG. 2A, convex region 140A rises outwardly in elevation from the neutral elevation (0) along second curved edge 134AA, whereas concave region 142A extends below the neutral elevation (0) away from first curved edge 134A toward suction side 144A. The precise locations, contours, and number of concave region 142A and convex region 140A may vary depending upon operational criteria and location of the platform within gas turbine engine 10 (FIG. 1). Computational fluid dynamics can be used to define the specific location and contours of the platforms for weakening the horseshoe vortices and correspondingly improving engine efficiency.

As shown in FIG. 2B, first curved edge 134A does not extend only generally radially with respect to engine centerline $C_L$. Rather, first curved edge 134A is angled so as to extend both circumferentially and axially with respect to engine centerline $C_L$. Curved edge 134CC, second curved edge 134AA and curved edge 134B are angled in a manner similar to first curved edge 134A. Additionally, curved edges 134A, 134AA, 134CC, and 134B can be angled in an axial direction or both giving platforms a changing thickness in the axial direction.

First curved edge 134A is spaced from and is paralleled by curved edge 134CC. Similarly, second curved edge 134AA is spaced from and is paralleled by curved edge 134B. First curved edge 134A is disposed to suction side 144A of airfoil 130A while second curved edge 134AA is disposed to pressure side 146A of airfoil 130A. As a result of this configuration, curved edges such as curved edges 134A, 134AA, 134B, 134BB, 134CC, and 134D allow gas turbine engine 10 (FIG. 1) to be more efficient by reducing gas flow penetration from the main gas flow path through gaps between adjacent platforms. Additionally, curved edges such as curved edges 134A, 134AA, 134B, 134BB, 134CC, and 134D act to increase the operational life of platforms by disposing the curved edges away from an area of a higher temperature adjacent suction side of airfoil. Curved edge platforms can also be easier to manufacture having only a single concave region to the suction side of the airfoil and a single convex region to the pressure side of the airfoil. This simplified manufacturing configuration reduces the cost and time associated with fabricating the platforms.

FIG. 2B shows a cross-section of airfoil 130A and platform 132A as well as a portion of platform 132C and platform 132B. For ease of reference, the neutral elevation surface (indicated as 0 elevation) is illustrated with a straight dashed line (although the surface is in fact arcuate). As shown in FIG. 2B, airfoil 130A includes suction side 144A and pressure side 146A. Platform 132A includes first curved edge 134A, second curved edge 134AA, convex region 140A and concave region 142A. Platform 132B includes curved edge 134B. FIG. 2B also illustrates curved edge 134CC of platform 132C.

In the embodiment of FIG. 2B, first curved edge 134A is disposed to suction side 144A of airfoil 130A while second curved edge 134AA is disposed to pressure side 146A of airfoil 130A. First curved edge 134A denotes a termination point of concave region 142A along the neutral elevation surface. Concave region 142A extends from first curved surface 134A to suction side 144A. Second curved edge 134AA denotes a termination point of convex region 140A along the neutral elevation surface. Convex region 140A extends from second curved surface 134AA to pressure side 146A. In other embodiments, one or both of convex region 140A and concave region 142A may not extend entirely to curved edges 134A and 134AA but be separated therefrom by, for example, an area of platform having neutral elevation (0 elevation). One or both of convex region 140A and concave region 142A may not extend entirely to airfoil 132A but instead be separated therefrom by lands. It should also be understood that as used herein, convex region means a region projecting above the neutral elevation surface and need not be geometrically convex in a mathematical sense. Similarly, concave region means a region depressed below the neutral elevation surface and need not be geometrically concave in a mathematical sense.

The present disclosure describes vanes and/or blades with platforms having curved edges. In one embodiment, the curved edges extend along a neutral elevation surface of the platform. As a result of this configuration, the platform has a convex cross-sectional shape disposed to the pressure side of the airfoil and the platform has a concave cross-sectional shape disposed to the suction side of the airfoil. The curved edges allow the gas turbine engine to be more efficient by reducing gas flow penetration from the main gas flow path through gaps between adjacent platforms. Additionally, the curved edges act to increase the operational life of the platform by disposing the edges away from an area of higher temperature adjacent the suction side of the airfoil. In some instances, curved edge platforms are easier to manufacture, thereby reducing the cost and time associated with fabricating the platforms.

Discussion of Possible Embodiments

The following are non-exclusive descriptions of possible embodiments of the present invention.

A gas turbine engine component includes an airfoil and a platform. The airfoil has a pressure side and an opposite suction side. The platform is connected to the airfoil and has a first curved edge to the suction side of the airfoil and a second curved edge to the pressure side of the airfoil. The first and second curved edges extend along a surface of the platform having a neutral elevation with respect to a reference axisymmetrical platform surface for the gas turbine engine.

The component of the preceding paragraph can optionally include, additionally and/or alternatively, any one or more of the following features, configurations and/or additional components:

the platform includes surface contouring between one of the suction side and the first curved edge or the pressure side and the second curved edge;

a concave region extends between the first curved edge and the suction side, and a convex region extends between the second curved edge and the pressure side;

the concave region has an entirely negative elevation with respect to the reference axisymmetrical platform surface for the gas turbine engine;

the convex region has an entirely positive elevation with respect to the reference axisymmetrical platform surface for the gas turbine engine;

the platform has no convex region is located to the suction side, and the platform has no concave region is located to the pressure side;

the first curved edge has a curvature that minors a curvature of the suction side; and the second curved edge has a curvature that mirrors a curvature of the pressure side.

A stage for a gas turbine engine includes a row of airfoils and a platform attached to each airfoil. The airfoils are spaced apart from one another to define flow channels therebetween. Each airfoil has a pressure side and an opposite suction side. Each platform has a first curved edge to the suction side of the airfoil and a second curved edge to the pressure side of the airfoil. The first and second curved edges extend along a surface of the platform having a neutral elevation with respect to a reference axisymmetrical platform surface for the gas turbine engine. The platform includes surface contouring between one of the suction side and the first curved edge or the pressure side and the second curved edge.

The stage of the preceding paragraph can optionally include, additionally and/or alternatively, any one or more of the following features, configurations and/or additional components:

a concave region extends between the first curved edge and the suction side, and a convex region extends between the second curved edge and the pressure side;

the concave region has an entirely negative elevation with respect to the reference axisymmetrical platform surface for the gas turbine engine;

the convex region has an entirely positive elevation with respect to the reference axisymmetrical platform surface for the gas turbine engine;

the platform has no convex region is located to the suction side, and the platform has no concave region is located to the pressure side;

the first curved edge has a curvature that minors a curvature of the suction side; and the second curved edge has a curvature that mirrors a curvature of the pressure side.

A gas turbine engine includes a row of airfoils and a platform attached to each airfoil. The airfoils are spaced apart from one another to define flow channels therebetween. Each airfoil has a pressure side and an opposite suction side. Each platform has a first curved edge to the suction side of the airfoil and a second curved edge to the pressure side of the airfoil. The first and second curved edges extend along a surface of the platform having a neutral elevation with respect to a reference axisymmetrical platform surface for the gas turbine engine. The platform includes surface contouring between the suction side and the first curved edge and between the pressure side and the second curved edge.

The gas turbine engine of the preceding paragraph can optionally include, additionally and/or alternatively, any one or more of the following features, configurations and/or additional components:

a concave region extends between the first curved edge and the suction side, and a convex region extends between the second curved edge and the pressure side;

the concave region has an entirely negative elevation with respect to the reference axisymmetrical platform surface for the gas turbine engine;

the convex region has an entirely positive elevation with respect to the reference axisymmetrical platform surface for the gas turbine engine; and the first curved edge has a curvature that minors a curvature of the suction side.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine component comprising:
an airfoil having a pressure side and an opposite suction side; and
a platform connected to the airfoil and having a first curved edge to the suction side of the airfoil and a second curved edge to the pressure side of the airfoil, wherein the first and second curved edges extend along a surface of the platform having a neutral elevation with respect to a reference axisymmetrical platform surface for the gas turbine engine, and wherein the platform includes surface contouring between one of (a) the suction side and the first curved edge and (b) the pressure side and the second curved edge, and wherein the platform has no convex region located between the first curved edge and the suction side, and wherein the platform has no concave region located between the second curved edge and the pressure side.

2. The component of claim 1, wherein a concave region extends between the first curved edge and the suction side, and wherein a convex region extends between the second curved edge and the pressure side.

3. The component of claim 2, wherein the concave region has an entirely negative elevation with respect to the reference axisymmetrical platform surface for the gas turbine engine.

4. The component of claim 2, wherein the convex region has an entirely positive elevation with respect to the reference axisymmetrical platform surface for the gas turbine engine.

5. The component of claim 1, wherein the first curved edge has a curvature that conforms to a curvature of the suction side.

6. The component of claim 1, wherein the second curved edge has a curvature that conforms to a curvature of the pressure side.

7. A stage for a gas turbine engine comprising:
a row of airfoils spaced apart from one another to define flow channels therebetween, wherein each airfoil has a pressure side and an opposite suction side; and
a platform connected to each airfoil, each platform having a first curved edge to the suction side of the airfoil and a second curved edge to the pressure side of the airfoil, wherein the first and second curved edges extend along a surface of the platform having a neutral elevation with respect to a reference axisymmetrical platform surface for the gas turbine engine, and wherein the platform includes surface contouring between one of (a) the suction side and the first curved edge and (b) the pressure side and the second curved edge, wherein the platform has no convex region located between the first curved edge and the suction side, and wherein the platform has no concave region located between the second curved edge and the pressure side.

8. The stage of claim 7, wherein a concave region extends between the first curved edge and the suction side, and wherein a convex region extends between the second curved edge and the pressure side.

9. The stage of claim 8, wherein the concave region has an entirely negative elevation with respect to the reference axisymmetrical platform surface for the gas turbine engine.

10. The stage of claim 8, wherein the convex region has an entirely positive elevation with respect to the reference axisymmetrical platform surface for the gas turbine engine.

11. The stage of claim 7, wherein the first curved edge has a curvature that conforms to a curvature of the suction side.

12. The stage of claim 7, wherein the second curved edge has a curvature that conforms to a curvature of the pressure side.

13. A gas turbine engine comprising:
a row of airfoils spaced apart from one another to define flow channels therebetween, wherein each airfoil has a pressure side and an opposite suction side; and
a platform connected to each airfoil, each platform having a first curved edge to the suction side of the airfoil and a second curved edge to the pressure side of the airfoil, wherein the first and second curved edges extend along a surface of the platform having an entirely neutral elevation with respect to a reference axisymmetrical platform surface for the gas turbine engine, and wherein the platform includes surface contouring between the suction side and the first curved edge and between the pressure side and the second curved edge.

14. The gas turbine engine of claim 13, wherein a concave region extends between the first curved edge and the suction side, and wherein a convex region extends between the second curved edge and the pressure side.

15. The gas turbine engine of claim 13, wherein the concave region has an entirely negative elevation with respect to the reference axisymmetrical platform surface.

16. The gas turbine engine of claim 13, wherein the convex region has an entirely positive elevation with respect to the reference axisymmetrical platform surface.

17. The gas turbine engine of claim 13, wherein the first curved edge has a curvature that conforms to a curvature of the suction side.

* * * * *

UNITED STATES PATENT AND TRADEMARK OFFICE
CERTIFICATE OF CORRECTION

| | | |
|---|---|---|
| PATENT NO. | : 9,874,101 B2 | Page 1 of 1 |
| APPLICATION NO. | : 14/652657 | |
| DATED | : January 23, 2018 | |
| INVENTOR(S) | : JinQuan Xu | |

It is certified that error appears in the above-identified patent and that said Letters Patent is hereby corrected as shown below:

In the Specification

Column 6, Line 4:
Delete "minors"
Insert --mirrors--

Column 6, Line 38:
Delete "minors"
Insert --mirrors--

Column 7, Line 1:
Delete "minors"
Insert --mirrors--

Signed and Sealed this
Tenth Day of April, 2018

Andrei Iancu
*Director of the United States Patent and Trademark Office*